United States Patent

[11] 3,627,136

[72] Inventors Svatopluk Mackrle
 Brno;
 Vladimir Mackrle, Praha, both of Czechoslovakia
[21] Appl. No. 51,471
[22] Filed July 1, 1970
[45] Patented Dec. 14, 1971
[73] Assignee Ceskoslovenska Akademie ved
 Praha, Czechoslovakia
[32] Priority July 10, 1969
[33] Switzerland
[31] 10698/69

[54] ARRANGEMENT FOR BIOLOGICAL CLEANING OF ORGANICALLY POLLUTED LIQUIDS COMPOSED OF BUILDING UNITS
6 Claims, 1 Drawing Fig.
[52] U.S. Cl. ................................ 210/201, 210/258, 210/262, 210/294, 210/512, 210/519, 210/540
[51] Int. Cl. .......................................... B01d
[50] Field of Search .......................... 210/201, 210, 252, 258, 261, 262, 294, 512, 519, 540

[56] References Cited
UNITED STATES PATENTS

| | | | |
|---|---|---|---|
| 863,168 | 8/1907 | Griswold | 210/201 X |
| 1,742,911 | 1/1930 | Gutman | 210/252 |
| 2,889,929 | 6/1959 | Kivel | 210/201 X |
| 3,353,679 | 11/1967 | Hirsch | 210/519 X |
| 3,550,783 | 11/1970 | Holloway | 210/540 X |

Primary Examiner—S. Leon Bashore
Assistant Examiner—Robert L. Lindsay, Jr.
Attorneys—Richard Low and Murray Schaffer ABSTRACT: An arrangement for biological cleaning of organically polluted liquids composed of building units including at least two substantially cylindrical horizontal bodies which are placed alongside the other, with the upper part of their mantles forming the bottom of a separating space of the cleaned liquid and of the coagulated suspension, said separating space being provided between the upper parts of the mantles of said cylindrical bodies.

The cylindrical bodies communicate with each other, one of the bodies communicates with the separating space which has a trough to discharge clarified liquid.

Patented Dec. 14, 1971
3,627,136
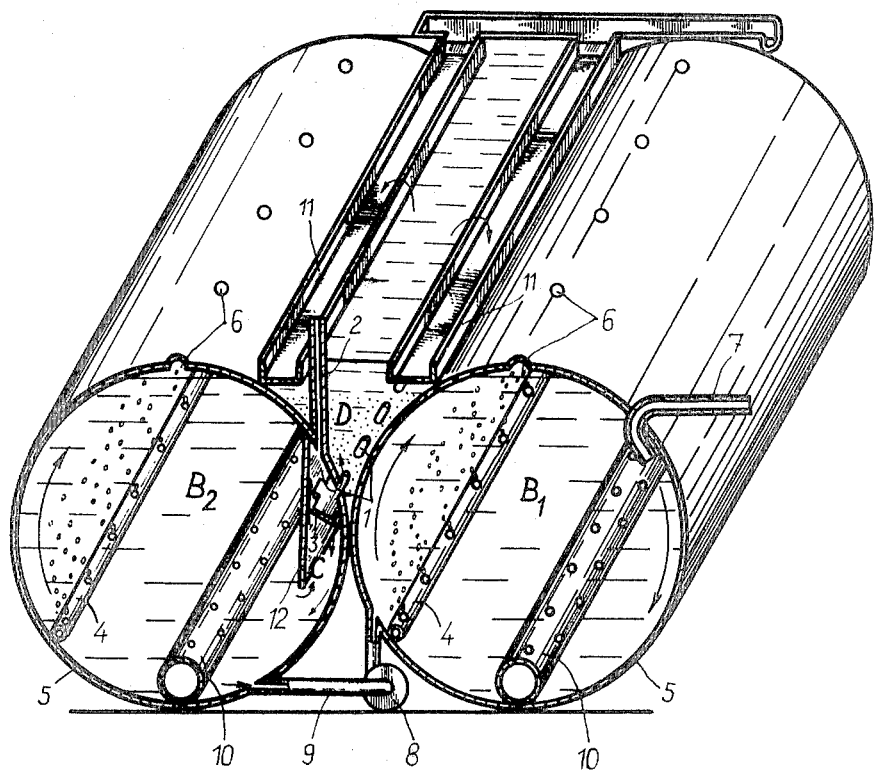
SVATOPLUK MACKRLE
VLADIMIR MACKRLE
INVENTORS

1

ARRANGEMENT FOR BIOLOGICAL CLEANING OF ORGANICALLY POLLUTED LIQUIDS COMPOSED OF BUILDING UNITS

BACKGROUND OF THE INVENTION

This invention relates to an arrangement for biological cleaning of organically polluted liquids which can be assembled from a number of ready made building units.

It has been found advantageous to combine in some arrangements for cleaning of organically polluted liquids, particularly for arrangements having a lower capacity, the bioflocular process with an aerobic stabilization of the sludge with a retaining of the cleaned liquid in the bioflocculation space for one or more days. The sludge remains in such a case a sufficiently long time in aerobic conditions, so that its stabilization is achieved. The stabilized sludge is after sedimentation in the bioflocculation space periodically drained from the bottom of the respective vessel.

Several systems of cleaning stations are known, which operate on the principle of simultaneous bioflocculation and aerobic stabilization of the sludge as for instance the so called oxidation ditch or small compact biological cleaning stations where spaces for bioflocculation and for separation of the suspension by filtration by means of an imperfectly floating sludge blanket are determined by a system of separating walls.

All these actually known arrangements have a number of drawbacks. A drawback of the oxidation ditches is their need of a large floor space and a high energy consumption for one unit of cleaned liquid.

The main drawback of compact units are their dimensions, which do not allow their transport in the assembled state and require substantial additional work on the site. Compact units capable to be transported and mounted on the site as finished products are limited to the smallest units with a capacity corresponding to units required for communities with hundreds of inhabitants. A further drawback of compact cleaning units is that they are pretentious to manufacture due to their disadvantageous geometric shapes which are generally rectangular basins or flat vertical tanks which in addition require a number of built-in separating walls for separating in a common tank the bioflocculation space from the separating space.

The object of the invention is the provision of a complete building unit for biological cleaning of liquids, from a number of similar units a larger-size cleaning arrangement could be assembled.

It is another object of the invention to provide a building unit, which could be easily transported in the assembled state by current transport means.

SUMMARY OF THE INVENTION

With these and other objects in view as will hereinafter become apparent, the invention provides a unit comprising at least two vessels with substantially cylindrical mantles with a horizontal axis, aligned side by side and joined together along their contact line, the upper part of said mantles forming at least partly the bottom of a separating space with an imperfectly floating sludge blanket, which separating space is located between the upper part of both said vessels. One of said vessels, serving as bioflocculation space is connected with the bottom of the separating space by openings, in front of which openings a deaeration space is provided, connected with the bioflocculation space solely at the bottom.

DESCRIPTION OF THE DRAWING

The attached drawing shows schematically a vertical cross section of an exemplary embodiment of a building unit for the above mentioned purpose.

DESCRIPTION OF THE PREFERRED EMBODIMENT

The building unit as indicated in the drawing comprises two bioflocculation spaces $B_1$ and $B_2$ having the shape of vessels with cylindrical mantles 5 with horizontal axis, which vessel are placed one alongside the other so that both mantles 5 are in contact and are joined together along their contact line. The upper parts of the mantles 5 above their place of contact form the bottom of the separating space D with an imperfectly floating sludge blanket. The space D is connected with the bioflocculation space $B_2$ by inlet openings 1 in the mantle 5 and a deaeration space C is provided adjacent said openings 1 in the bioflocculation space $B_2$. The deaeration space C is separated in its upper part from the bioflocculation space $B_1$ by a partition wall 12 and is provided at the top with a venting tube 2 terminating into the surrounding atmosphere. The lower part of the deaeration space C communicates with the bioflocculation space $B_2$. Below the inlet openings 1 an inclined baffle wall 3 is provided in the deaeration space C, leaving a free passage both close to the mantle 5 and close to the partition wall 12 separating the deaeration space C from the bioflocculation space $B_2$. Both bioflocculation spaces $B_1$ and $B_2$ are provided with means for dispersing air in these spaces and for simultaneously imparting to the liquid contained therein a rotating motion along a horizontal axis. A tube 4 provided with a number of openings and connected to an air supply is indicated in the drawing for this purpose. In the bioflocculation space $B_2$ this tube 4 is situated at the opposite side with respect to the deaeration space C. Both bioflocculation spaces $B_1$ and $B_2$ have venting openings 6 at the top of the mantles 5.

The raw liquid with agents promoting the creation of a floccular suspension from the impurities is supplied into the bioflocculation space $B_1$ through the supply conduit 7 at one of its ends. Both bioflocculation spaces $B_1$ and $B_2$ are at both ends interconnected by connecting pipes 9, the connecting pipe 9 on the supply end of the raw water being provided with a pump 8. Collecting throughs 11 for removal of the clarified liquid are provided in the upper part of the separating space D with the imperfectly floating sludge blanket. Sludge collectors 10 are at the bottoms of the bioflocculation spaces $B_1$ and $B_2$.

By the term "imperfectly floating sludge blanket" a blanket is supposed, composed of floating particles of coagulated impurities in the liquid which are allowed to settle by gravity at the bottom of the respective space, whereas for a "perfectly floating sludge blanket" these particles are maintained by the upstreaming liquid always in a floating condition and cannot settle at the bottom.

The described arrangement operates as follows: The raw liquid together with added agents promoting the creation of floccular particles from the contained impurities enters the bioflocculation space $B_1$ at one of its ends by way of the supply conduit 7 in direction of rotation of the cleaned liquid, for instance water, which rotation is caused by the mammot effect of the aerating means, in the case given of the tubes 4. The excess air escapes by way of the venting openings 6 at the top of the mantles 5. The cleaned liquid circulates in both parts $B_1$ and $B_2$ of the bioflocculation space interconnected at both ends by connecting pipes 9, in one of which pipes a pump is incorporated promoting a longitudinal circulation in both vessels. Floccular particles are thus created forming a suspension in the liquid. The water with the suspension enters from the bioflocculation space $B_2$ the separation space D through the inlet openings 1, after having prior passed through the deaeration space C where the remaining air escapes over the venting tube 2. The spaces C and D can be arranged either along the whole length of the bioflocculation space $B_2$ or along a part thereof. Due to the inclination of the baffle wall 3, the ascending water with the suspension is passing along the partition wall 12 and enters the separating space D through the upper parts of the openings 1.

By a side-by-side arrangement of liquid horizontal bioflocculation spaces $B_1$ and $B_2$ of cylindrical shape the separation space D is determined by the upper parts of their mantles 5. The suitable geometric shapes of the thus created separation space enable for a vertical passage of the cleaned water to form from the suspension created by bioflocculation an imperfectly floating sludge blanket through which the cleaned liquid must pass and is thus filtered. The cleaned liquid is removed by means of the collecting troughs 11 at the top of the separating space D. The suspension retained in the sludge blanket sediments due to gravity and passes through the lower parts of the inlet openings 1 into the deaeration space C where it descends along the mantle 5 and is entrained by the circulating liquid which circulates in the same direction as the returning suspension. The shape and dimensions of the deaerating space C are chosen so as to achieve in combination with the action of the inclined baffle wall 3 the deaeration of the cleaned liquid prior to its entrance into the sedimentation space D. The separated air is removed from the deaerating space C by way of the venting tube 2 into the ambient space. The stabilized sludge, concentrated on the bottom of the bioflocculation spaces $B_1$ and $B_2$ is periodically drained from the sludge collector 10.

The arrangement according to this invention has a number of advantages. The main advantage is the conception comprising complete building units, which enables an easy assembling of a cleaning station of the required efficiency at the place of destination by a mere aligning of complete technological and constructional units which are easy transportable. These building units have the shape of cylindrical vessels with a horizontal axis which are statically very advantageous, which can be easily completely manufactured in the work shop and which due to their favorable loading gauge can be easily transported to the place of destination. Thus all installing work on the site is limited to the correct seating of the vessels and to their interconnecting. By a mere aligning of more such units a complete technological station for biological cleaning of water of the required output can be obtained. As the separation space is formed by the upper parts of the mantles of these vessels which themselves serve as spaces for bioflocculation, no further individual separating space has to be provided what substantially simplifies the construction of these vessels to simple cylindrical vessels. The most advanced manufacturing methods of manufacture of similar cylindrical vessels can be thus applied, for instance of vessels of laminated glass cloth, reducing thus substantially the weight, and enabling an easier transport and installing.

All these advantages result in a substantial reduction of investment costs and enable the mass manufacture of building units for biological cleaning stations enabling to build up stations with different outputs. The advantageous cylindrical shapes of the vessels simultaneously influence favorably the action of oxygen of the supplied air, showing in a reduction of energy consumption for 15 to 20 percent.

We claim:

1. An arrangement for biological cleaning of organically polluted liquids by bioflocculation and subsequent separation of the created suspension by filtration through an imperfectly floating sludge blanket comprising in combination:
  at least two substantially cylindrical vessels with a horizontal axis forming at least partly bioflocculation spaces,
  said cylindrical vessels arranged one alongside the other firmly connected at their contact line,
  the upper parts of their mantles forming at least partly the bottom of a separating space,
  the separating space provided between the upper part of the mantles of both cylindrical vessels
  means for the supply of the treated liquid with agents promoting coagulation into at least one of said vessels
  means connecting the two vessels for flow of liquid
  means for the supply of dispersed air into said vessels, positioned to promote a rotating motion of the liquid along the longitudinal axis of the vessels
  means to discharge liquid from a vessel to said separating space
  means for the discharge of the cleaned liquid from the separating space,
  means for the discharge of the separated sludge at the bottom of said vessel.

2. An arrangement as set forth in claim 1, at least one of said cylindrical horizontal vessels forming a bioflocculation space connected with the bottom of the separating space by openings, a deaeration space provided in said cylindrical vessel adjacent to said openings, said deaeration space connected with the remaining space of this vessel solely at the bottom of the deaeration space and below said openings, venting means provided at the top of the deaeration space.

3. An arrangement as set forth in claim 1, both said substantially cylindrical vessels forming bioflocculation spaces, interconnected at both ends by connecting pipes, enabling a simultaneous longitudinal circulation of the liquid in both cylindrical vessels.

4. An arrangement as set forth in claim 2 provided with a baffle wall below the opening connecting the bottom of the separating space with the deaeration space, said baffle wall separating the ascending liquid with rests of the dispersed air from the sediment suspension descending from the separating space.

5. An arrangement as set forth in claim 3 pumps means provided in one of the connecting pipes, connecting both ends of both vessels forming bioflocculation spaces.

6. An arrangement as set forth in claim 1 in which the cylindrical vessels are mutually connected.

* * * * *